Jan. 3, 1956    J. L. KALLUS    2,728,948
MOLDS FOR MAKING DOLLS COMPOSED OF PLASTIC MATERIAL
Filed Nov. 24, 1953    2 Sheets-Sheet 1
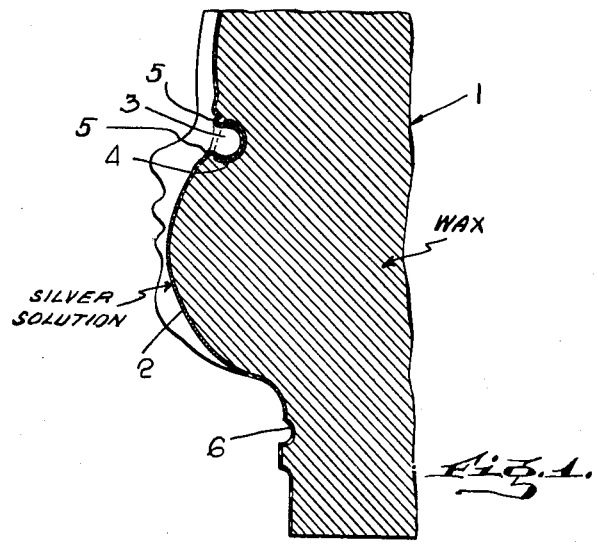
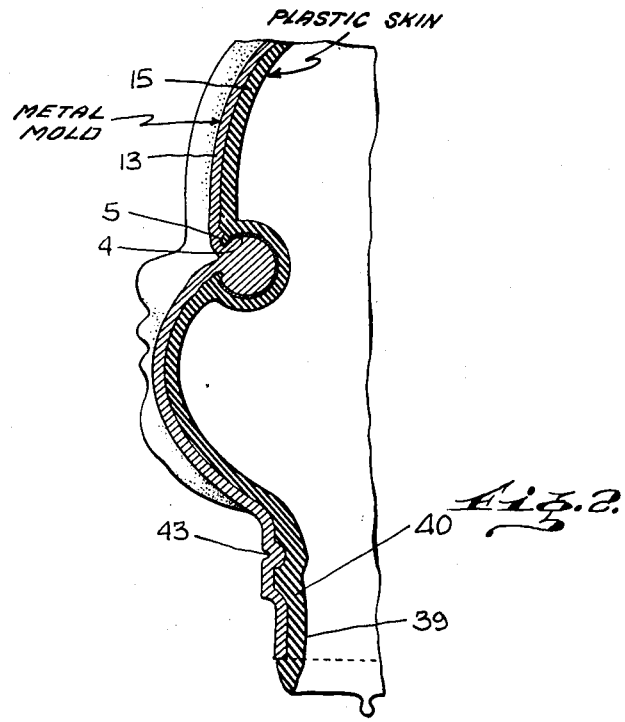
INVENTOR
Joseph L. Kallus
BY Gustav Drews
his ATTORNEY

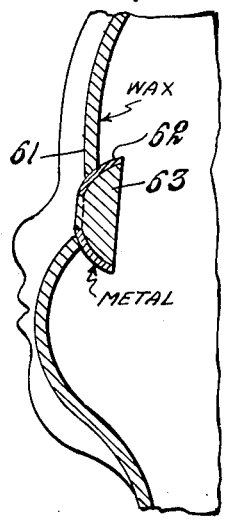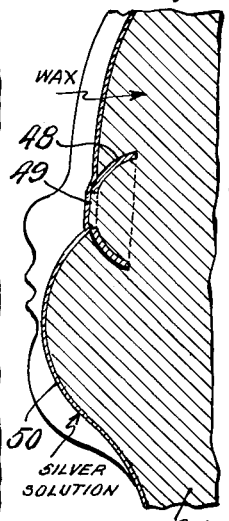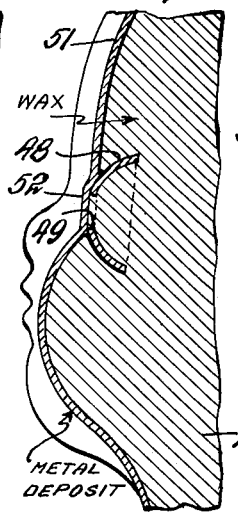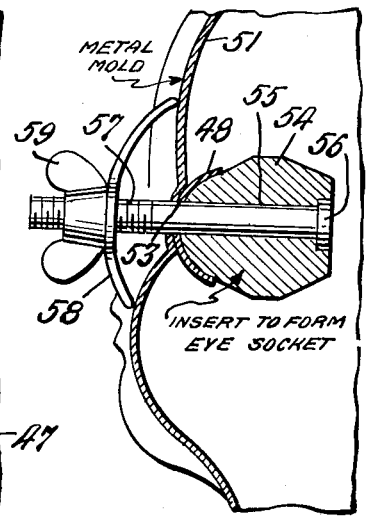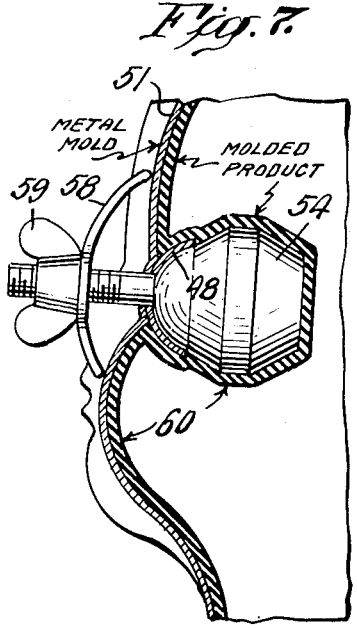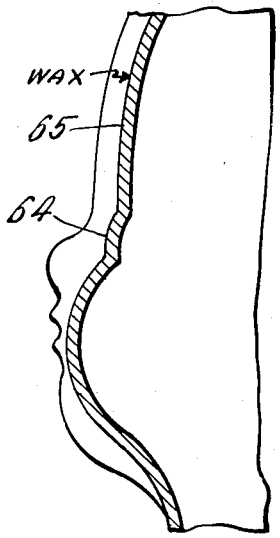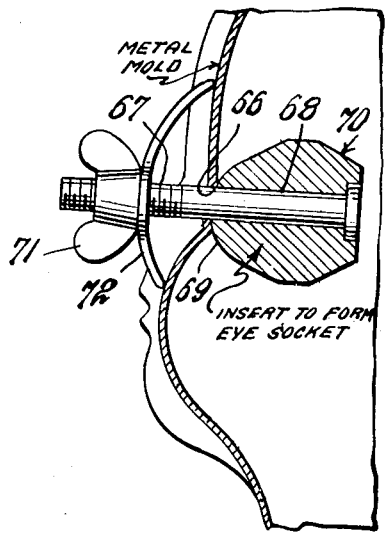

United States Patent Office 2,728,948
Patented Jan. 3, 1956

2,728,948

MOLDS FOR MAKING DOLLS COMPOSED OF PLASTIC MATERIAL

Joseph L. Kallus, Brooklyn, N. Y.

Application November 24, 1953, Serial No. 394,007

4 Claims. (Cl. 18—34)

This invention relates to molds for making dolls composed of plastic material, such as plastisol or the like, and constitutes continuations in part of applications for patent Ser. No. 227,610 filed May 22, 1951, and Ser. No. 379,454, filed September 10, 1953.

Among the objects of the present invention, it is aimed to provide an improved mold for making dolls composed of plastic material, such as plastisol and the like, whereby as an instance a one-piece body member and a one-piece head member may be formed which is soft and flexible and approaches the sense of touch of the human skin, and which doll portions may be equipped with recesses and openings to receive elements such as eyes, and the like.

With compositions such as rubber, as an instance, due to the process steps of forming such dolls composed of rubber, it was necessary to form the molds in halves which always presented a problem of removing the protrusion or rib at the seam where the mold halves engaged, aside from the extra labor and expense in carrying out such additional step.

Although it has been known to make one-piece doll portions, such as the head member, body member and the like from resilient plastic material, difficulty has heretofore been encountered in securing to the same, eye inserts, and the like. The difficulty was due primarily to the problem of forming recesses of the desired contour and conformation. To this end, the present invention aims to provide an improved mold which will facilitate the formation of a one-piece head of a doll composed of a substance such as plastisol and the like, with recesses to accommodate eye inserts, and the like.

These and other features, capabilities and advantages of the present invention will appear from the subjoined detailed description of specific embodiments of the improved mold and also of the parts used to form the mold of the present invention illustrated in the accompanying drawings, in which—

Fig. 1 is a fragmental sectional view of the head part of a wax model coated with a suitable metal preparatory to the electroplating treatment.

Fig. 2 is a fragmental sectional view of the head part of a mold after the plastic skin has been formed inside of the same, but before the skin has been removed from the mold.

Fig. 3 is a fragmental sectional view of the head portion of another embodiment of a head model.

Figs. 4, 5, 6 and 7 illustrate in fragmental sectional views four successive stages of a third method for forming the mold and use thereof, Fig. 4 of the wax model with dielectric deposit, Fig. 5 of the wax model with the electroplated metal deposit, Fig. 6 with the bulbous protuberance secured in place and wax removed, and Fig. 7 with the plastic skin deposit in place.

Figs. 8 and 9 illustrate in fragmental sectional views two not successive stages of a fourth method for forming the mold and use thereof, Fig. 8 of the wax model and Fig. 9 of the final mold with the wax removed.

To form the mold of the present invention, it is necessary, see Fig. 1, to form a lost wax model composed of a readily fusible wax, such as electroplater's wax and then to cover the model with a coat of some metal, such as a solution of silver nitrate conventionally used for electroplating with copper applied in the conventional way by the interaction while in flight of a spray of silver nitrate and a spray of a reducing agent resulting in a conductive silver deposit on the surface of the wax model. In Fig. 1 the wax model part 1 is shaped to form a doll's head of the doll structure which is covered with a coating 2 of some dielectric metal such as results from reducing the conventional silver nitrate solution used for electroplating copper. Here attention is particularly called to the recess 3 formed to emulate the eye socket to receive the independent metal protuberance, such as the metal insert 4 which is inserted into the model 1 so that a rib 5 is formed around the insert 4. At the neck there is formed an annular recess 6 in the model 1.

Obviously, instead of a silver nitrate solution, other coatings may be used depending upon the electroplating deposit, such for instance as a nickel or chromium deposit as an instance. Thereupon the head 1 produced with its inserts 4 and coating 2 is introduced into the electrolytic bath, and depending upon the thickness desired for the mold wall 13, see Fig. 2, the wax model 1 is retained in the bath a greater or less period of time. When the desired thickness of mold wall 13 has been produced, the model 1 is removed from the bath and then heated to the temperature desired to melt the wax in the model 1, which melted wax is then poured out of the mold when the mold 13 is ready for use. Preferably, however, before proceeding to form doll structures, it is then desired to cool the mold 13 to a temperature approximating 100° F. or less. If the mold had previously been made and kept in stock, then it is desired to heat the mold 13 so that it has a temperature of about 100° F. Thereupon a plastic mass is poured into the mold 13. Preferably when the plastic mass has so been introduced into the mold 13, the mold is rocked to and fro, an action known as slushing in the technique, to enable the plastic mass intimately to contact the entire inner surface of the mold 13. Due to the consistency of the plastic mass, especially when having a temperature of about 70° F., and the mold is approximately 100° F., a substantial layer 15, of the plastic mass will adhere and cling to the inner face of the mold 13, so that the excess can be poured out and a substantial layer will remain clinging throughout to the inner wall of the mold 13. Excellent results have been achieved when the plastic mass consists of a mixture of polyvinyl chloride resin, dioctyl phthalate, diiso-octyl adipate, and santicizer. After the excess has so been poured out, the mold 13 with its inner layer 15 is heated to a temperature of about 370° F. for about five minutes. Thereupon the mold 13 is removed from the heater and sprayed with water of about 70° F. for about one minute. Thereupon the layer 15 will have been coagulated or cured and be in condition to be stripped, intact, from the inner face of the mold 13.

One of the features of the present invention consists in forming a mold having unusual intricate contours, particularly if the contours include deep crevices or pockets or even elongated pockets. When the mold calls for intricate contours such as are required to form eye sockets, it has been found desirable to insert and partially embed in the wax model 1 as aforesaid, the metal inserts 4 which may be machine cut to the precise contour required. If the metal inserts 4 are composed of copper or brass, then when the electroplating process ensues, the wall of the mold 13 will unite with the inserts 4, and the inserts 4 will become an integral part, or at least a fixed part, of the mold 13.

In the formation of these skins it was also discovered that an electroplate deposit would not produce a precisely contoured pocket beyond a certain depth. In other words, beyond a certain depth the inner end or bottom of the socket would attract either a very thin deposit as compared to the rest of the mold, or else the corners adjacent the bottom would disappear, the sharp corners being filled with deposits so there eventually would appear a slope or incline between the side walls and the bottom of the socket and eliminate any resemblance to the original sharp corner socket such as might be formed between a cylinder and its base.

Excellent results have been achieved when the thickness of the mold wall 13 approximated between .070 and .090 of an inch and the thickness of the skin 15 approximated between .085 and .125 of an inch.

Obviously the metal insert 4 shown in Fig. 2 need not be chambered but could be solid, and need not be spherical even when used to form sockets for receiving eye reproductions, but could be comparatively shallow inserts, of oval or other form in cross section.

As an instance, in the embodiment shown in Figs. 4 to 7, inclusive, in the formation of a mold for a doll's head, in the solid block of wax 47 there is inserted the metal insert 48, where the eye formations are located, consisting of a segment of a metal shell, as an instance having a predetermined seat forming face or concave or dished inner face forming a seat and having an opening 49 in said shell 48, with the wax 47 disposed not only inside of the shell 48 but extending into the opening 49 with the dielectric coating 50, such as a silver nitrate solution shown in section in Fig. 4.

In Fig. 5, the succeeding stage of the method is illustrated in which the electroplated metal deposit 51 has combined with the coating 50 to form the mold wall showing a wall portion 52 extending across the opening 49 in the shell 48 and the shell 48 attached to the wall 51 by the electroplated wall portion 52.

In Fig. 6, the mold wall 51 and shell 48 have been freed from the wax 47, and the opening 53 drilled to remove what appeared as the wall portion 52 in Fig. 5, a bulbous eye socket forming protuberance 54 secured to the shell 48 by a pin 55 extending through the protuberance 54 having a head 56 on its inner end abutting against the inner end of the protuberance 54 and the shank 57 of the pin 55 extending from the protuberance through the opening 53 and then through the anchoring plate 58, the shank 57 being threaded to receive a screw or the like such as the wing nut 59 to draw the protuberance into secure position.

In Fig. 7, there is illustrated the plastic skin or molded product 60 deposited on the inner face of the mold wall 51 and outer face of the shell 48 and protuberance 54.

The embodiment illustrated in Fig. 3 differs from the embodiment illustrated in Fig. 4 primarily in that the wax model has been chambered to form the wall 61 and the metal shell 62 pressed into place and filled with wax as at 63.

In the embodiment shown in Figs. 8 and 9, the location for the bulbous protuberance is defined by the wax wall 64 in a chambered wax wall 65 similar to the chambered wax wall 61 of the embodiment illustrated in Fig. 3 except that here, the metal insert 62 is omitted, and the opening 66, see Fig. 9, cut through the wall portion formed adjacent the wall 64, Fig. 8, of the wax wall 65 to receive the shank 67 of the pin 68. The edge of the opening 66 around the depression formed by the wall portion 64 of Fig. 8, forming an inner predetermined or dished face, forms the seat for the outer end 69 of the bulbous protuberance 70.

Obviously the bulbous protuberance 70 may be a chambered shell instead of a solid piece. However, whether solid or chambered, the bulbous protuberance 70, as well as the shell 48, should preferably be composed of copper or brass on account of their ability readily to conduct heat.

It is obvious that various changes and modifications may be made in the details of construction without departing from the general spirit of the invention as set forth in the appended claims.

I claim:

1. A mold having a metal wall forming a chambered doll head and a restricted neck portion with a main opening at the entrance to the neck portion and two small openings defining locations for eye conformations in said wall adjacent said openings having inwardly facing concave faces to form seats, position-defining preformed bulbous eye socket forming metal protuberances positioned on said seats to form eye sockets, anchoring devices engaging the outer face of said wall, and bolts extending through the openings in said metal wall, through said metal parts and said anchoring devices to secure said metal parts in place, each metal protuberance having a greater main diameter than the diameter of its associated opening.

2. A mold having an electrodeposited metal wall forming a chambered doll head and a restricted neck portion with a main opening at the entrance to the neck portion and two small openings defining locations for eye conformations, arcuate metal shells having inwardly facing concave faces connected to said electrodeposited metal wall to form inwardly facing concave seats, there being openings in said shells registering with the small openings in said metal wall, position-defining preformed bulbous eye socket forming metal parts positioned on said seats and extending inwardly to form eye sockets, and nut and bolt connections extending through said metal walls, metal parts and shells to connect said metal parts in place, each bulbous metal part having a greater main diameter than the diameter of its associated opening.

3. A mold having an electrodeposited metal wall forming a chambered doll head and a restricted neck portion with a main opening at the entrance to the neck portion and two small openings defining locations for eye conformations, metal devices having inwardly facing predetermined faces connected to said electrodeposited metal wall to form inwardly facing predetermined seats, there being openings in said devices registering with the small openings in said metal wall, position-defining preformed bulbous eye socket forming metal parts positioned on said seats and extending inwardly to form eye sockets, and connections extending through said metal walls, devices and metal parts to connect said metal parts in place, each bulbous metal part having a greater main diameter than the diameter of its associated opening.

4. A mold having an electrodeposited metal wall forming a chambered doll head and a restricted neck portion with a main opening at the entrance to the neck portion and two small openings defining locations for eye conformations, dished metal parts having inwardly facing receding faces connected to said electrodeposited metal wall to form inwardly facing dished seats, there being openings in said dished metal parts registering with the small openings in said metal wall, position-defining preformed bulbous eye socket forming metal parts positioned on said seats extending inwarding to form eye sockets, and bolt connections extending through said metal walls, and dished and bulbous metal parts to connect said bulbous metal parts in place, each bulbous metal part having a greater main diameter than the diameter of its associated opening.

References Cited in the file of this patent

UNITED STATES PATENTS

| | | |
|---|---|---|
| 2,182,775 | Abouchar | Dec. 12, 1939 |
| 2,363,337 | Kelly | Nov. 21, 1944 |
| 2,469,892 | Rempel | May 10, 1949 |
| 2,629,131 | Martin et al. | Feb. 24, 1953 |